(12) United States Patent
Hill et al.

(10) Patent No.: US 10,975,871 B2
(45) Date of Patent: Apr. 13, 2021

(54) RETAINING RING ANTI-MIGRATION SYSTEM AND METHOD

(71) Applicant: Halliburton Energy Services, Inc., Houston, TX (US)

(72) Inventors: Jason Eugene Hill, Catoosa, OK (US); Joshua Wayne Webster, Owasso, OK (US); Wesley John Nowitzki, Tulsa, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 280 days.

(21) Appl. No.: 16/089,221

(22) PCT Filed: Apr. 2, 2018

(86) PCT No.: PCT/US2018/025728
§ 371 (c)(1),
(2) Date: Sep. 27, 2018

(87) PCT Pub. No.: WO2018/204005
PCT Pub. Date: Nov. 8, 2018

(65) Prior Publication Data
US 2020/0011332 A1    Jan. 9, 2020

Related U.S. Application Data

(60) Provisional application No. 62/500,386, filed on May 2, 2017.

(51) Int. Cl.
*F04D 13/10* (2006.01)
*F04D 29/041* (2006.01)
(Continued)

(52) U.S. Cl.
CPC ............ *F04D 13/10* (2013.01); *B23P 15/008* (2013.01); *F04D 29/041* (2013.01);
(Continued)

(58) Field of Classification Search
CPC . F04D 1/06; F04D 1/063; F04D 1/066; F04D 13/08; F04D 13/086; F04D 13/10;
(Continued)

(56) References Cited

U.S. PATENT DOCUMENTS 2,886,355 A * 5/1959 Wurzel ................. F16B 21/183
403/326
4,706,367 A * 11/1987 Garringer ........... E04F 11/1817
29/453

(Continued)

FOREIGN PATENT DOCUMENTS

KR        10-0482791 B1    3/2005

OTHER PUBLICATIONS

Patent Cooperation Treaty, International Search Report and Written Opinion, PCT Appln. No. PCT/US2018/025728, dated Jul. 11, 2018.

*Primary Examiner* — Christopher Verdier
(74) *Attorney, Agent, or Firm* — McguireWoods, LLP (57) ABSTRACT

A retaining ring anti-migration system and method. A retaining ring anti-migration system for a centrifugal pump shaft includes a pair of trap sleeves that enclose a pair of retaining rings, one retaining ring around each end of the shaft enclosed by one trap sleeve, the pair of retaining rings configured to bound axial migration of the shaft both upwards and downwards. A retaining ring anti-migration system includes a retaining ring seated in a shaft groove extending circumferentially around an electric submersible pump (ESP) shaft, a trap sleeve extending around the ESP shaft adjacent to the retaining ring, the trap sleeve including a sleeve body secured to the ESP shaft such that the trap sleeve rotates with the ESP shaft, and a jacket extending (Continued)

axially from the sleeve body over an outer diameter of the retaining ring with a clearance between the shaft and the jacket.

20 Claims, 11 Drawing Sheets

(51) Int. Cl.
    *F04D 29/044*     (2006.01)
    *F04D 29/64*     (2006.01)
    *B23P 15/00*     (2006.01)
    *F04D 29/62*     (2006.01)
    *F04D 1/06*     (2006.01)
    *F04D 13/08*     (2006.01)

(52) U.S. Cl.
    CPC ......... *F04D 29/044* (2013.01); *F04D 29/628* (2013.01); *F04D 29/648* (2013.01); *B23P 2700/13* (2013.01); *F04D 1/06* (2013.01); *F04D 13/08* (2013.01); *F05D 2230/64* (2013.01); *F05D 2230/644* (2013.01); *Y10T 29/49872* (2015.01); *Y10T 29/49876* (2015.01)

(58) Field of Classification Search
    CPC .... F04D 29/041; F04D 29/043; F04D 29/044; F04D 29/448; F04D 29/628; F04D 29/605; F04D 29/648; F05D 2230/64; F05D 2230/642; F05D 2230/644; B23P 2700/13; B23P 15/008; Y10T 29/49876; Y10T 29/49872
    See application file for complete search history.

(56) References Cited

U.S. PATENT DOCUMENTS

| | | |
|---|---|---|
| 6,773,214 B2 | 8/2004 | Jakubowski, Jr. et al. |
| 10,385,676 B2 * | 8/2019 | Parks ...................... E21B 44/10 |
| 2012/0107114 A1 * | 5/2012 | Brunner .............. F04D 29/0413 |
| | | 415/229 |
| 2012/0257985 A1 * | 10/2012 | Parmeter ............... F04D 29/047 |
| | | 417/53 |
| 2014/0112808 A1 | 4/2014 | Moore et al. |
| 2015/0064034 A1 | 3/2015 | Davis et al. |
| 2015/0226219 A1 | 8/2015 | Johnson et al. |
| 2016/0115998 A1 | 4/2016 | Jayaram et al. |

* cited by examiner

RETAINING RING ANTI-MIGRATION SYSTEM AND METHOD

BACKGROUND

1. Field of the Invention

Embodiments of the invention described herein pertain to the field of retaining rings for electric submersible pump shafts. More particularly, but not by way of limitation, one or more embodiments of the invention enable a retaining ring anti-migration system and method.

2. Description of the Related Art

Fluid, such as gas, oil or water, is often located in underground formations. When pressure within the well is not enough to force fluid out of the well, the fluid must be pumped to the surface so that it can be collected, separated, refined, distributed and/or sold. Centrifugal pumps are typically used in electric submersible pump (ESP) applications for lifting well fluid to the surface. In multistage centrifugal pumps, multiple stages of impeller and diffuser pairs are stacked in series around the pump's shaft, with each successive impeller sitting on a diffuser of the previous stage. The pump shaft extends longitudinally through the center of the stacked stages. The shaft rotates, and the impeller is keyed to the shaft causing the impeller to rotate with the shaft and resulting in pressure lift. A conventional vertical ESP assembly includes, from bottom to top, a motor, seal section, intake section, and multi-stage centrifugal pump. The assembly components each have a splined shaft running longitudinally through their centers that are connected together and rotated by the motor.

Figure 1A:
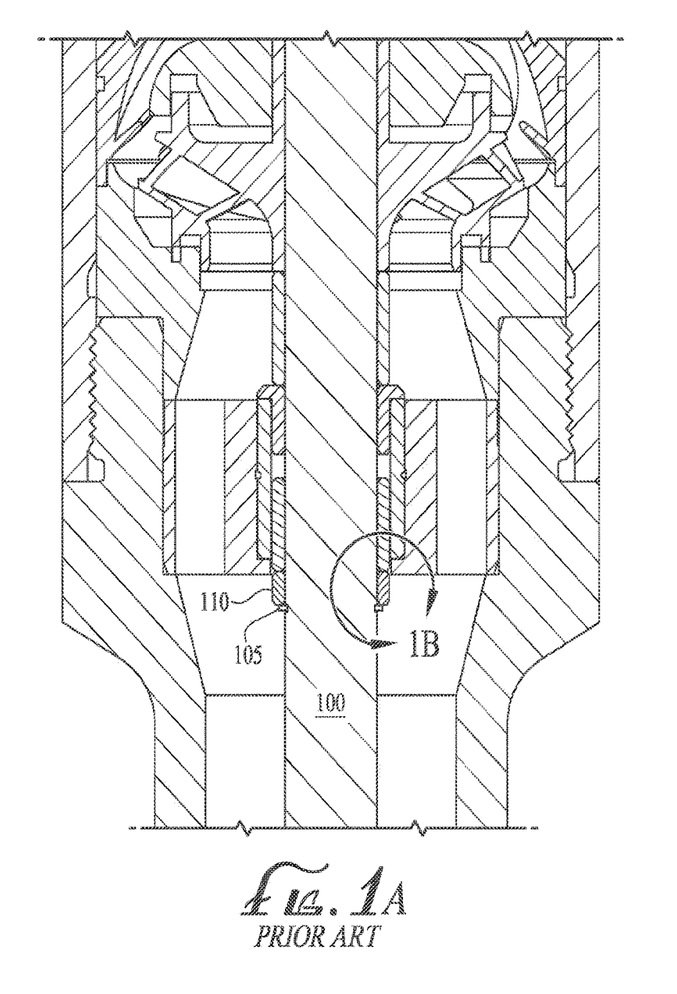
FIG. 1A is a cross sectional view of a conventional shaft with conventional spiral ring of the prior art.
Figure 1B:
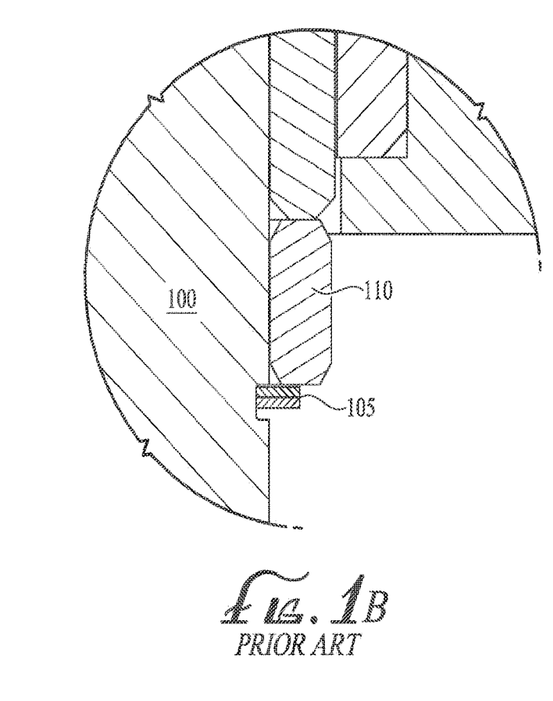
FIG. 1B is an enlarged view of the conventional shaft and conventional spiral ring of FIG. 1A of the prior art.

Conventional shafts included within the ESP assembly, such as the motor shaft, seal shaft or pump shaft typically include a spiral ring at each end to prevent the shaft from axial migration. Typically, the spiral rings are seated within grooves near both the top and bottom of the shaft. When in place, the spiral ring acts as a shoulder to prevent the shaft from sliding axially beyond an allowable distance of shaft travel. A typical spiral ring installed near the bottom of an ESP pump shaft is shown in FIG. 1A and FIG. 1B. Conventional spiral ring 105 extends around conventional shaft 100 near the end of the shaft and sits inside a groove below conventional spacer sleeve 110.

A problem that arises is that conventional spiral rings unseat from their shaft grooves and migrate out of position. The migration may be a result of poor installation practices such as over-stretching or external forces during pump operation. Once outside of the shaft groove, the conventional spiral ring can no longer function to limit a shaft's axial movement, and the shaft becomes axially displaced. Axial displacement of the shaft can lead to limited production and possible system failure.

As is apparent from the above, currently available shaft spiral rings tend to migrate and thus are not suitable to retain ESP shafts that are prone to axial displacement. Therefore, there is a need for a retaining ring anti-migration system and method.

SUMMARY

One or more embodiments of the invention enable a retaining ring anti-migration system and method.

A retaining ring anti-migration system and method is described. An illustrative embodiment of a retaining ring anti-migration system includes a retaining ring seated in a shaft groove, the shaft groove extending circumferentially around an electric submersible pump (ESP) shaft, a trap sleeve extending around the ESP shaft adjacent to the retaining ring, the trap sleeve including a sleeve body secured to the ESP shaft such that the trap sleeve rotates with the ESP shaft, and a jacket extending axially from the sleeve body over an outer diameter of the retaining ring, and a clearance extending between the ESP shaft and an inner diameter of the jacket. In some embodiments, the outer diameter of the retaining ring is pressed against the inner diameter of the jacket. In certain embodiments, the trap sleeve further includes a sleeve groove extending circumferentially around the inner diameter of the jacket opposite the shaft groove, the retaining ring seated at least partially in the shaft groove and at least partially in the sleeve groove. In some embodiments, the sleeve groove is proximate an intersection between the sleeve body and the jacket, and the retaining ring abuts the sleeve body. In certain embodiments, the sleeve body is secured to the ESP shaft by a key, the jacket includes a notch 180° from the key, and the retaining ring includes a pair of ears that extend into the notch. In some embodiments, the ESP shaft is a centrifugal pump shaft and the retaining ring is seated proximate splines at an end of the ESP shaft. In certain embodiments, the retaining ring is separated from the splines by a slop clearance. In some embodiments, an intersection between the sleeve body and the jacket forms a shoulder, and the retaining ring is wedgeable against the shoulder to bound axial migration of the ESP shaft. In some embodiments, there are at least two retaining rings and at least two trap sleeves around the ESP shaft, a first retaining ring of the at least two retaining rings and a first trap sleeve of the at least two trap sleeves secured adjacent a top of the ESP shaft, and a second retaining ring of the at least two retaining rings and a second trap sleeve of the at least two trap sleeves secured adjacent a bottom of the ESP shaft. In certain embodiments, the jacket is configured to prevent radial expansion of the retaining ring. In some embodiments, the retaining ring is one of a spiral ring, spring ring or a snap ring.

An illustrative embodiment of a method for installing a retaining ring anti-migration system around an electric submersible pump (ESP) shaft includes aligning a retaining ring with a jacket groove that extends circumferentially around an inside of a jacket, the jacket extending from a body of a trap sleeve, passing a collar of a slip tool inside an inner diameter of the retaining ring to expand the retaining ring into the jacket groove, sliding the trap sleeve with the expanded retaining ring and slip tool around the ESP shaft until the retaining ring is aligned with a shaft groove and a keyway along the body of the trap sleeve is keyed to the ESP shaft, and removing the collar from inside the retaining ring to allow the retaining ring to relax into the shaft groove. In some embodiments the method further includes blocking migration of the retaining ring out of the shaft groove with the jacket. In certain embodiments, the relaxed retaining ring seats partially in the shaft groove and partially in the jacket groove. In some embodiments, the jacket includes a notch 180° from the keyway, the retaining ring includes a pair of ears, and the retaining ring is aligned with the jacket groove such that the pair of ears extend into the notch. In certain embodiments, the shaft groove is proximate an end of the ESP shaft and the retaining ring prevents axial migration of the ESP shaft. In some embodiments, prior to sliding the trap sleeve around the ESP shaft, the ESP shaft includes a second trap sleeve keyed proximate a second end of the ESP shaft, the second trap sleeve including a second jacket extending over a second retaining ring positioned around the ESP shaft. In certain embodiments, when installed, the retaining ring and the second retaining ring together prevent axial displacement of the ESP shaft beyond a slop clearance.

An illustrative embodiment of a retaining ring anti-migration system for a shaft of a centrifugal pump of an electric submersible pump assembly, the retaining ring anti-migration system including a pair of trap sleeves that enclose a pair of retaining rings, one retaining ring of the pair of retaining rings around each end of the shaft enclosed by one trap sleeve of the pair of trap sleeves, the pair of retaining rings configured to bound axial migration of the shaft both upwards and downwards, and a plurality of centrifugal pump stages between the pair of retaining rings. In some embodiments, each trap sleeve of the pair of trap sleeves includes a jacket extending from a body, the body keyed to the shaft and the intersection of the jacket and the body forming a shoulder against which the one retaining ring wedges to bound the axial migration of the shaft. In certain embodiments, the retaining ring anti-migration system further includes a series of sleeves keyed to the shaft between the one trap sleeve and an impeller of the centrifugal pump. In some embodiments, the pair of trap sleeves include a first trap sleeve proximate a bottom end of the shaft mated with a first retaining ring of the pair of retaining rings, and a second trap sleeve proximate a top end of the shaft mated with a second retaining ring of the pair of retaining rings, the first trap sleeve including an elongate jacket and the first retaining ring moveable axially underneath the jacket, and a second trap sleeve comprising a sleeve groove wherein the second retaining ring extends into the sleeve groove.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A retaining ring anti-migration system and method is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a "retaining ring" includes one or more retaining rings.

"Coupled" refers to either a direct connection or an indirect connection (e.g., at least one intervening connection) between one or more objects or components. The phrase "directly attached" means a direct connection between objects or components.

As used herein the terms "axial", "axially", "longitudinal" and "longitudinally" refer interchangeably to the direction extending along the length of a shaft, such as the shaft of an electric submersible pump (ESP) assembly component such as an ESP intake, multi-stage centrifugal pump, seal section, gas separator or charge pump.

"Downstream" or "upward" refers interchangeably to the longitudinal direction with the principal flow of lifted fluid when the pump assembly is in operation. By way of example but not limitation, in a vertical downhole ESP assembly, the downstream direction may be through the well in the direction towards the wellhead. The "top" of an element refers to the downstream-most side of the element, without regard to whether the pump assembly is horizontal, vertical, angled or extends through a radius.

"Upstream" or "downward" refers interchangeably to the longitudinal direction opposite the principal flow of lifted fluid when the pump assembly is in operation. By way of example but not limitation, in a vertical downhole ESP assembly, the upstream direction may be through the well in the direction opposite the wellhead. The "bottom" of an element refers to the upstream-most side of the element, without regard to whether the pump assembly is horizontal, vertical, angled or extends through a radius.

For ease of description, the invention is primarily described in terms of the shaft of a multistage centrifugal pump of an ESP assembly. However, illustrative embodiments are not so limited and may be employed in ESP components that utilize a shaft and/or drive shaft, for example the ESP motor, seal section, centrifugal pump, charge pump, gas separator and/or another similar shaft that utilizes retention against axial displacement. The retaining ring anti-migration system and method may be used with any shaft susceptible to axial shaft movement as a result of retaining ring migration including shafts of axial flow, mixed flow or radial flow pumps.

For ease of description as so as not to obscure the invention, illustrative embodiments are primarily described with respect to a retaining ring near the top and/or bottom of a centrifugal pump shaft. However, the invention is not so limited and may be used at any location along the length of a shaft where a spring ring, spiral ring, snap ring or other similar retaining ring is employed. For example, illustrative embodiments may be used at multiple locations along the shaft of a gas separator and/or may be included at any point along a shaft on which a spiral ring or snap ring is employed.

Illustrative embodiments may prevent migration of a retaining ring from its shaft groove while still permitting shaft travel within an allowable backlash range. Illustrative embodiments may mitigate risks associated with migrating retaining rings such as limited ESP production and premature failure of the ESP system. Illustrative embodiments may limit the axial movement of an ESP shaft despite applied forces during operation.

Illustrative embodiments include a trap sleeve surrounding a retaining ring that is seated within a groove on a rotatable shaft. The trap sleeve may include a sleeve body keyed to the shaft and a jacket extending axially from the body and separated from the shaft by a clearance. The jacket of the trap sleeve may surround the retaining ring's outer diameter and trap the retaining ring inside the jacket, which may provide a barrier to migration of the retaining ring from its shaft groove. In some embodiments, the trap sleeve may include a groove around its inner diameter opposite the shaft groove, and the retaining ring may be seated within and/or positioned between both the sleeve groove and the shaft groove. In some embodiments, the trap sleeve may include a notch, which notch may mate with the ears of a snap ring. The notch may be included on one side of the jacket, providing an opening through which the snap ring ears may extend and become similarly trapped. The notch may be positioned 180° from the keyed connection between the trap sleeve body and the shaft.

Illustrative embodiments may include a method of installing a retaining ring anti-migration system of illustrative embodiments. Illustrative embodiments may be particularly useful where multiple trap sleeves are employed on the same shaft. For example, where a first trap sleeve of illustrative embodiments has been installed around the bottom end of a shaft, the method of illustrative embodiments may be employed to install a second trap sleeve around the top end of the same shaft. An anti-migration retaining ring installation method of illustrative embodiments may include seating a retaining ring inside a groove on a trap sleeve's inner diameter. A slip tool may then be inserted inside the retaining ring to expand the retaining ring outward into the sleeve groove. The trap sleeve with expanded retaining ring and slip tool may then slide over the shaft's outer diameter until aligned with a shaft groove. The slip tool may then be removed, allowing the retaining ring to relax from an expanded state and seat inside the shaft groove. Once in place, the trap sleeve may block the retaining ring from migrating out of the shaft groove.

Figure 2A:
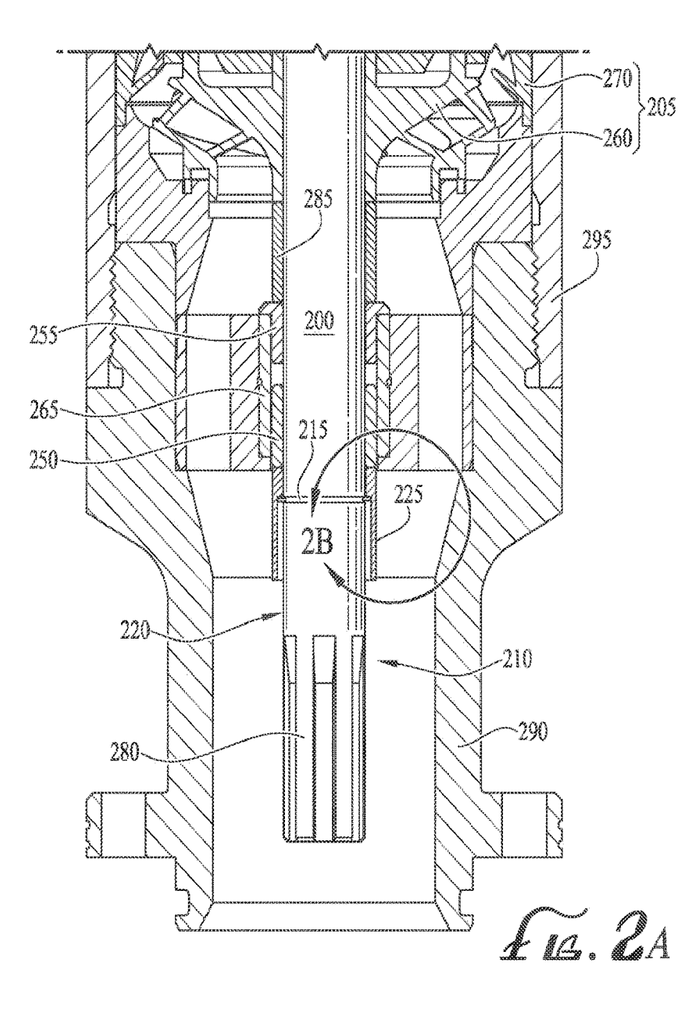
FIG. 2A is a cross sectional view of a retaining ring anti-migration system of an illustrative embodiment.
Figure 2B:
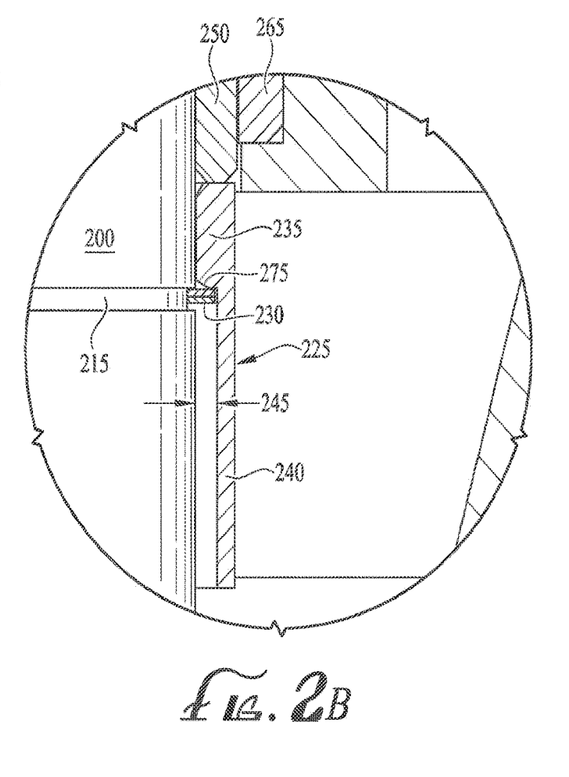
FIG. 2B is an enlarged view of the retaining ring anti-migration system of FIG. 2A.

FIGS. 2A-2B illustrate a retaining ring anti-migration system of an illustrative embodiment. Shaft 200 may extend centrally and longitudinally through an ESP assembly component such as a motor, seal section, centrifugal pump, charge pump, or gas separator. In the example shown in FIGS. 2A-2B, shaft 200 extends through a multi-stage centrifugal pump including stages 205 of stacked impeller 260 and diffuser 270 pairs. Impellers 260 may be keyed to shaft 200 such that impellers 260 rotate with shaft 200, and diffusers 270 may be non-rotating and enclosed within housing 295. One shaft end 210 may be at each of the top and bottom of shaft 200. Shaft end 210 may include splines 280 or another similar mating feature for rotating elements, which splines 280 may transfer torque between shaft 200 and other shafts stacked above and/or below shaft 200. In FIG. 2A, shaft end 210 extends through pump base 290 threaded to pump housing 295. Circumferential shaft groove 215 may extend 360° and/or at least partially around outer diameter of shaft 200 near, at, and/or proximate shaft end 210. Shaft groove 215 may be separated from splines 280 by slop clearance 220. In some embodiments, shaft groove 215 may be included anywhere along shaft 200 in which a retaining ring may be utilized to prevent axial shaft movement and/or slipping.

A certain amount of axial displacement of shaft 200 may be permitted during operation, for example to allow for thermal expansion or load deflection of shaft 200, but shaft 200 should not move longitudinally beyond the permitted length provided by slop clearance 220, which may for example be a centimeter or a few centimeters. Retaining ring 230 may be a spiral ring, snap ring, spring ring or other similar retaining ring, and may serve to limit axial movement of shaft 200 by acting as a shoulder and/or preventing shaft 200 displacement beyond the length of slop clearance 220 and/or permitted backlash. Retaining rings 230 may be seated within shaft grooves 215 positioned at, proximate and/or near shaft ends 210 and/or positioned along the length of shaft 200 as needed to provide protection against axial displacement of shaft 200. When seated inside a shaft groove 215 near the bottom of shaft 200, retaining ring 230 may limit upward axial movement of shaft 200. When seated near the top of shaft 200, retaining ring 230 may limit downward axial movement of shaft 200.

Trap sleeve 225 may surround the outer diameter of retaining ring 230 and may provide a barrier to migration of retaining ring 230 out of shaft groove 215. Retaining ring 230 may be seated in shaft groove 215, radially inward of trap sleeve 225. Turning to FIG. 2B, trap sleeve 225 may include sleeve body 235 and jacket 240. Sleeve body 235 may be keyed or otherwise coupled to shaft 200 by a torque transferring connection, and jacket 240 may extend from sleeve body 235 over retaining ring 230. Sleeve body 235 may be positioned either above or below retaining ring 230, depending on the location of retaining ring 230 along shaft 200. For example, where trap sleeve 225 is positioned near the top of shaft 200, trap sleeve 225 may be oriented with body 235 below retaining ring 230 and jacket 240 extending upwards over retaining ring 230. The edge of sleeve body 235 at the interface between sleeve body 235 and jacket 240, may form shoulder 275 adjacent to retaining ring 230. Depending on the position of shaft 200 and whether retaining ring 230 is on the top end 210 or bottom end 210 of shaft 210, shoulder 275 may extend slightly above retaining ring 230, slightly below retaining ring 230 and/or may abut retaining ring 230. Where sleeve body 235 abuts retaining ring 230, retaining ring 230 may act as shoulder that presses and/or wedges against sleeve body 235 and may prevent displacement of shaft 200 in the direction of sleeve body 235. For example, retaining ring 230 may prevent upward displacement of shaft 200 if sleeve body 235 is above retaining ring 230 or prevent downward displacement if sleeve body 235 is below retaining ring 230. Sleeve body 235 may be keyed to shaft 200 such that trap sleeve 225 rotates with shaft. Jacket 240 may rotate with shaft 200 by virtue of adjoinment with sleeve body 235, but jacket 240 may not be directly connected to shaft 200.

In the illustrative centrifugal pump of FIGS. 2A-2B, spacer sleeve 250 may be keyed to shaft above trap sleeve 225, and bearing sleeve 255, which may be flanged, may sit above spacer sleeve 250 inside bushing 265 to provide thrust and/or radial support to shaft 200. Standoff sleeve 285 may separate flanged sleeve 255 from impeller 260 and determine the running height of impeller 260. In some embodiments, shaft 200 may be a shaft of another ESP component, such as the motor, seal section, gas separator, and/or charge pump, which may similarly utilize retaining ring 230 and trap sleeve 225 anywhere along the components' respective drive shaft in which a retaining ring is utilized to mitigate shaft displacement.

Figure 3A:
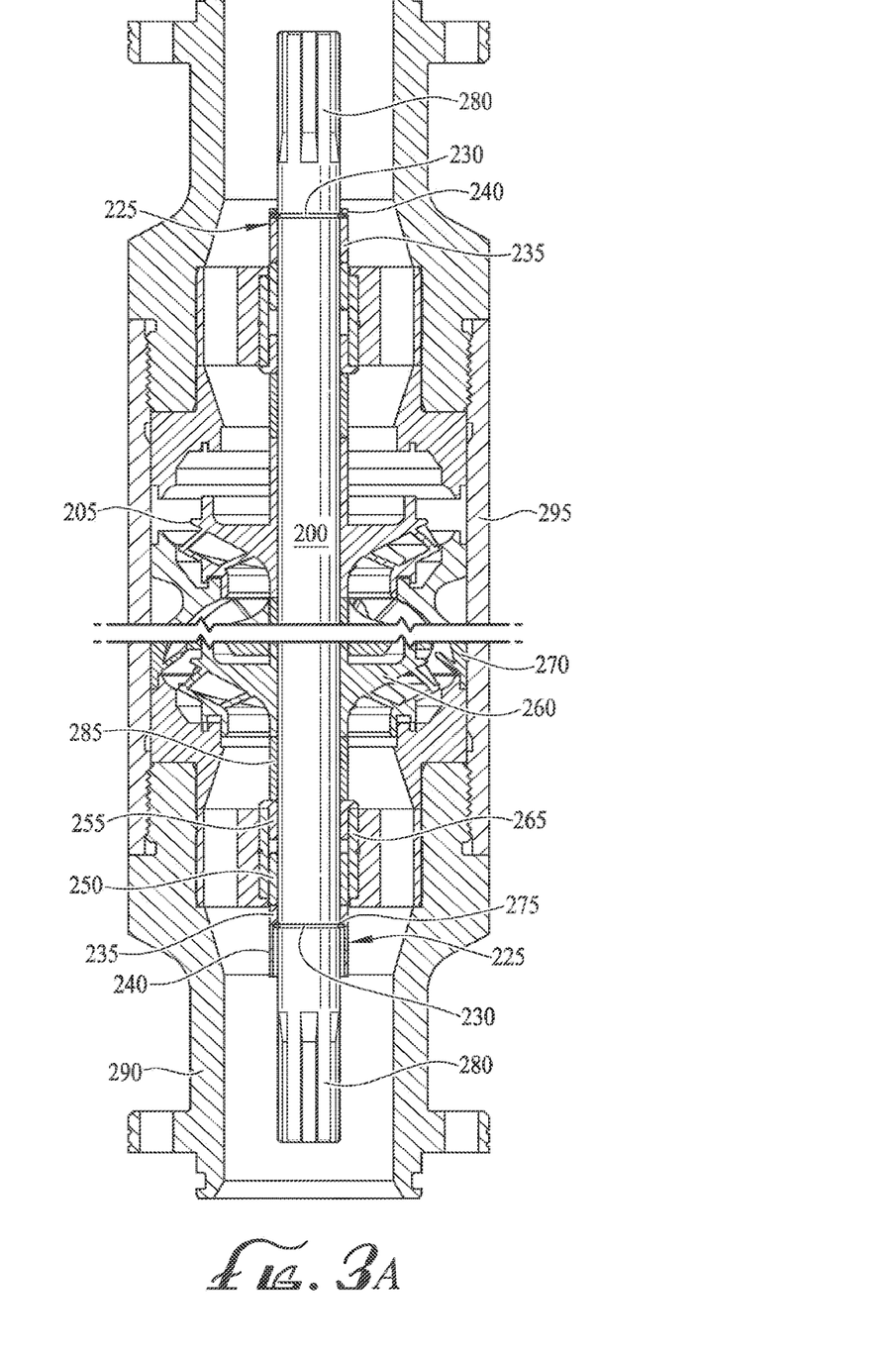
FIG. 3A is a cross sectional view of a retaining ring anti-migration system of an illustrative embodiment limiting upward movement of an exemplary shaft.
Figure 3B:
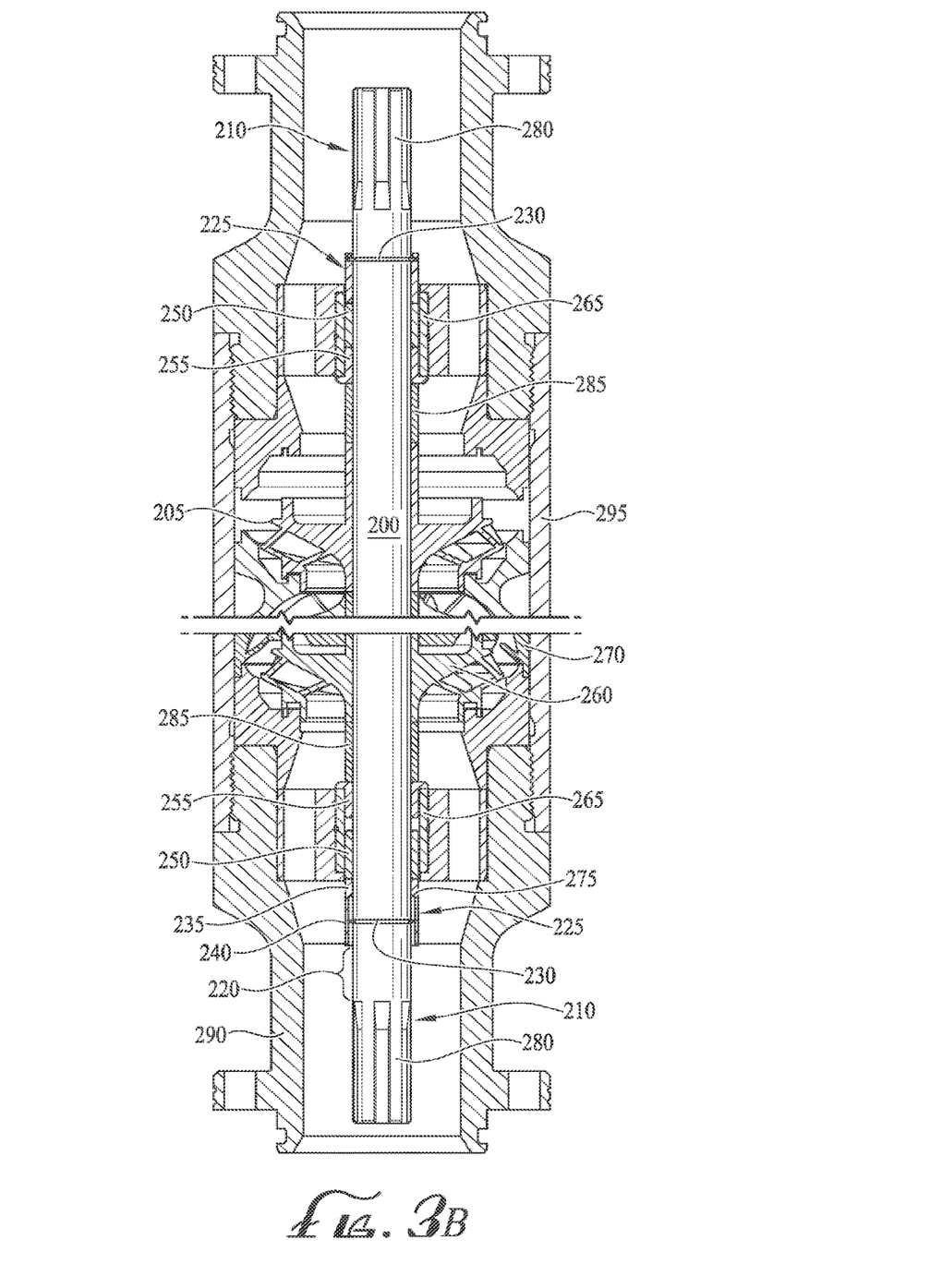
FIG. 3B is a cross sectional view of a retaining ring anti-migration system of an illustrative embodiment limiting downward movement of an exemplary shaft.

FIG. 3A and FIG. 3B illustrate exemplary displacement of shaft 200, within permitted slop, and operation of the anti-migration system of illustrative embodiments to limit such shaft 200 displacement beyond an allowable tolerance that does not adversely affect pump performance. FIG. 3A illustrates an example of upward shaft 200 displacement bounded by retaining ring 230 near the bottom of shaft 200. As shown in FIG. 3A, should shaft 200 displace upwards, retaining ring 230 near the bottom of shaft 200 may wedge against shoulder 275 formed at the intersection between body 235 and jacket 240 of trap sleeve 225. Keyed connections described herein may provide for torque transmission between shaft 200 and the keyed component, while permitting axial movement of the keyed component. Spacer sleeve 250, bearing sleeve 255, standoff sleeve 285 and impeller 260, all keyed to shaft 200, may slide along with shaft 200 by virtue of pressure from and/or wedging of retaining ring 230 at shoulder 275, until impeller 260 abuts the diffuser 270 above such impeller 260, thereby limiting the movement of shaft 200 and/or preventing shaft 200 from displacing through the head of the pump. In this example of upward shaft displacement, retaining ring 230 at the top of shaft 200 may remain enclosed within jacket 240 of top trap sleeve 225, despite movement of retaining ring 230 with shaft 200 within permitted slop clearance 220.

In some embodiments, trap sleeve 225 may be omitted at the top of shaft 200 and only trap sleeve 225 at the bottom of shaft 200 may be employed. For example, in some embodiments, upward shaft 200 displacement may be of greater concern than downward shaft displacement, and in such instances, a single trap sleeve 225 may be employed at, near and/or proximate the bottom end 210 of shaft without the need for a second trap sleeve 225 at, near and/or proximate the top end 210.

FIG. 3B illustrates an example of downward shaft displacement bounded by retaining ring 230 near the top of shaft 200. As illustrated in FIG. 3B, if shaft 200 were to displace downwards, a trap sleeve 225 and retaining ring 230 pair at the top of shaft 200 may limit downward movement of shaft 200 in a fashion similarly to as described above, with retaining ring 230 pressing downward onto shoulder 275 of trap sleeve 225 near the top of shaft 200. In this instance, retaining ring 230 at the bottom of shaft 200 may slide downward underneath jacket 240 of the trap sleeve 225 at the bottom of shaft 200, away from shoulder 275 of the bottom trap sleeve 225. The length of jacket 240 may be formed such that jacket 240 is long enough to enclose its paired retaining ring 230 despite the range of movement of shaft 200 permitted by the retaining ring 230 at the opposite end 210 of shaft 200.

Turning to FIG. 4A-4D, trap sleeve 225 may include jacket 240 that may extend axially from sleeve body 235 over, around and/or towards retaining ring 230 to enclose retaining ring 230 seated within shaft groove 215. Jacket 240 may trap retaining ring 230 and serve as a barrier to retaining ring 230 migration from shaft groove 215. Jacket 240 may be a portion of trap sleeve 225 that is not keyed to shaft 200 and/or does not abut, contact or directly couple to shaft 200. Jacket 240 may extend circumferentially around and over retaining ring 230. Once jacket 240 passes over retaining ring 230, clearance 245 (shown in FIG. 2B) may be formed between shaft 200 and jacket 240. Retaining ring 230 may be seated inside groove 215 and extend radially outward across clearance 245 towards the inner diameter of jacket 240. In a non-limiting illustrative embodiment, clearance 245 may be between 0.03 mm to 0.08 mm. The inner diameter of jacket 240 may be large enough to enclose the outer diameter of retaining ring 230 so as to trap retaining ring 230 inside shaft groove 215. Jacket 240 may trap retaining ring 230 by blocking radial migration of retaining ring 230, which may prevent retaining ring 230 from radial and/or axial movement that may otherwise cause retaining ring 230 to pop, slide, stretch and/or roll out of shaft groove 215. Jacket 240 may extend a length along shaft 200 that permits retaining ring 230 to move axially with shaft 200 while still remaining enclosed inside jacket 240 within shaft groove 215. In some embodiments, jacket 240 length may be about the same length as slop clearance 220. In an illustrative example, jacket 240 may extend 1.6-2.2 cm in length from sleeve body 235, which may allow retaining ring 230 to remain enclosed by jacket 240 despite a 1.6-2.2 cm displacement of shaft 200. When the anti-migration system of illustrative embodiments is installed, jacket 240 may press against retaining ring 230 outer diameter or there may be a space between the outer diameter of retaining ring 230 and the inner diameter of jacket 240.

Figure 4A:
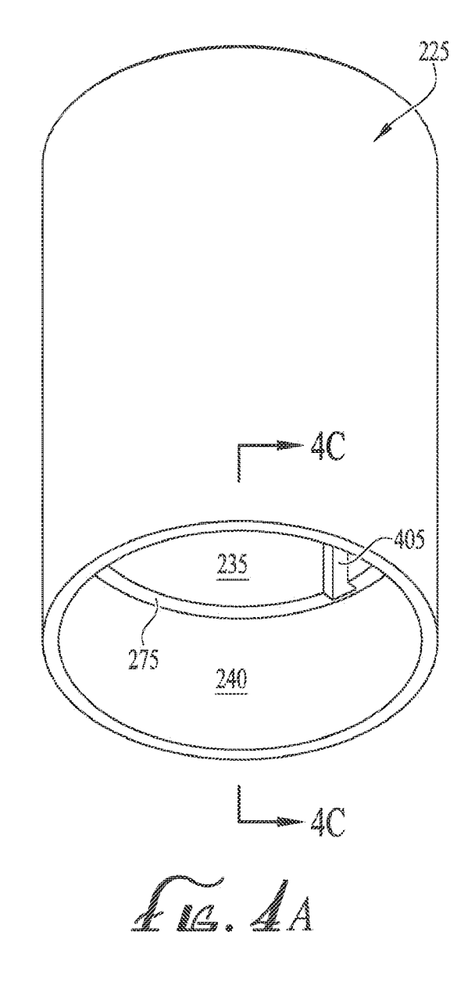
FIG. 4A is a perspective view of a trap sleeve of an illustrative embodiment.
Figure 4B:
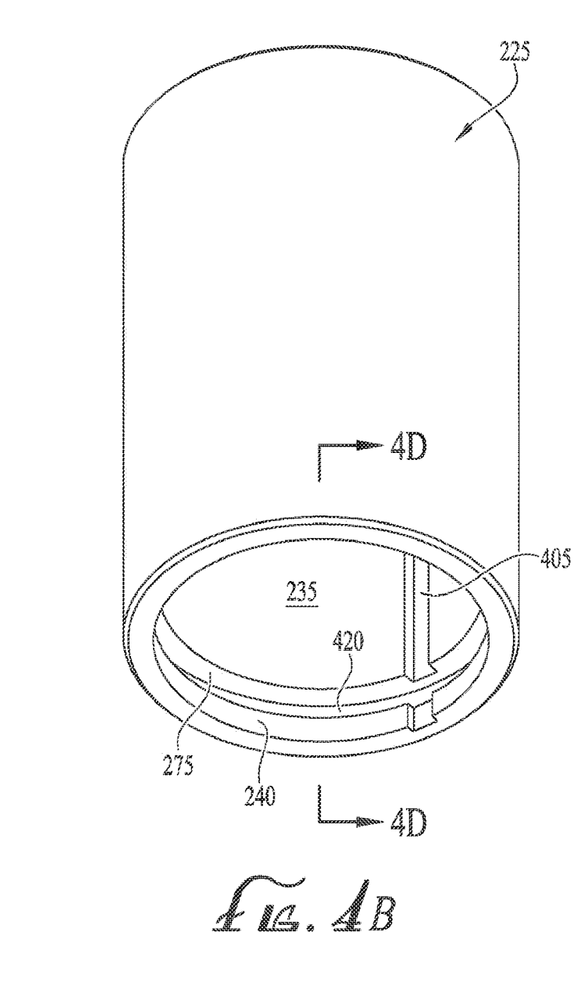
FIG. 4B is a perspective view of a trap sleeve of an illustrative embodiment having a sleeve groove of an illustrative embodiment.
Figure 4C:
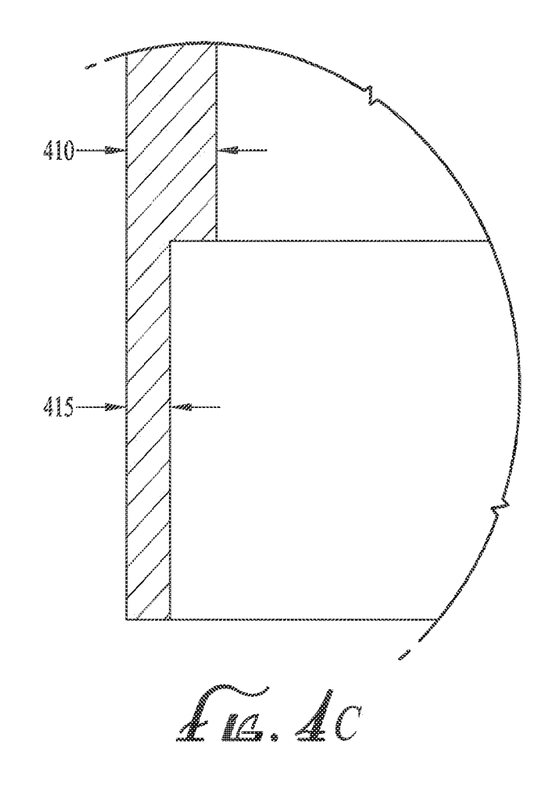
FIG. 4C is a cross sectional view across line 4C-4C of FIG. 4A of a trap sleeve of an illustrative embodiment.
Figure 4D:
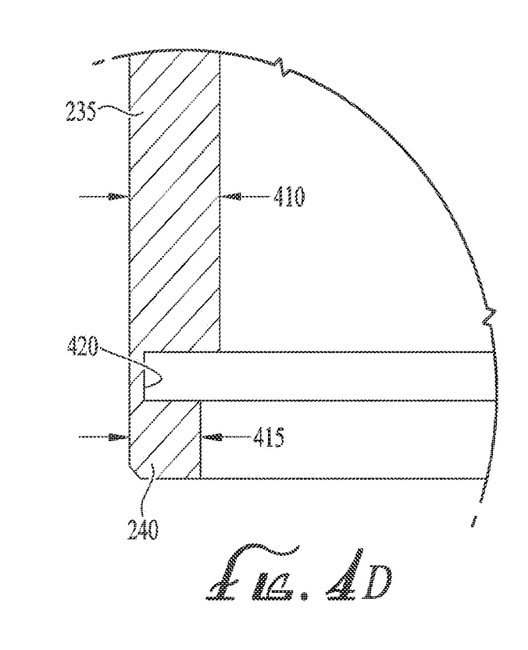
FIG. 4D is a cross sectional view across line 4D-4D of FIG. 4B of a trap sleeve of an illustrative embodiment having a sleeve groove of an illustrative embodiment.
Figure 6A:
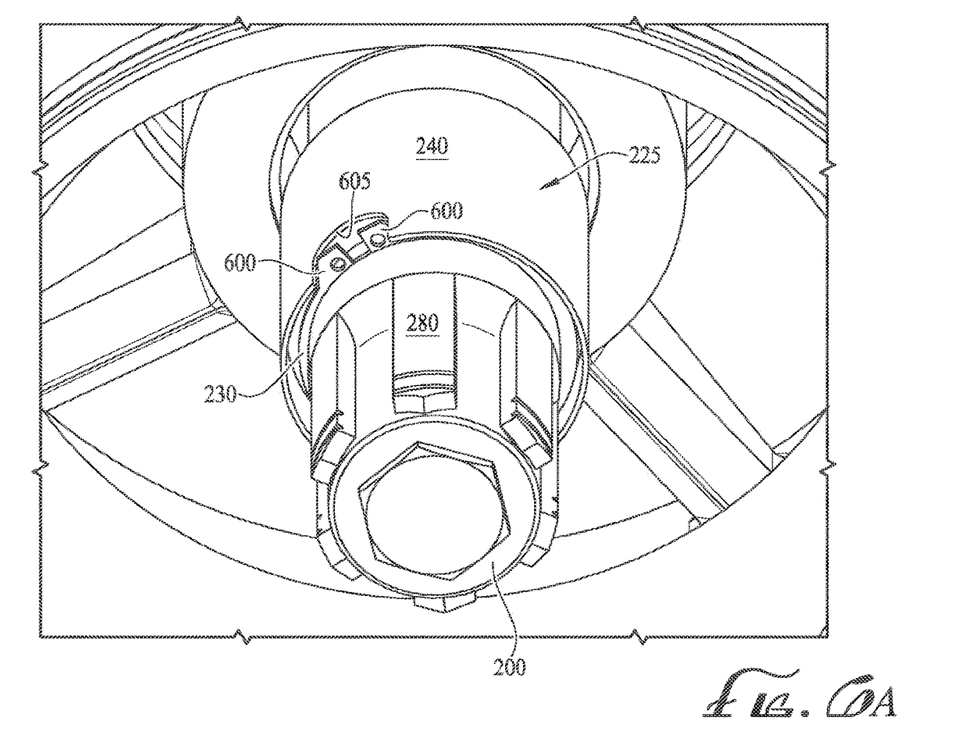
FIG. 6A is a bottom perspective view of a retaining ring anti-migration system of an illustrative embodiment illustrating a notched trap sleeve of illustrative embodiments.
Figure 6B:
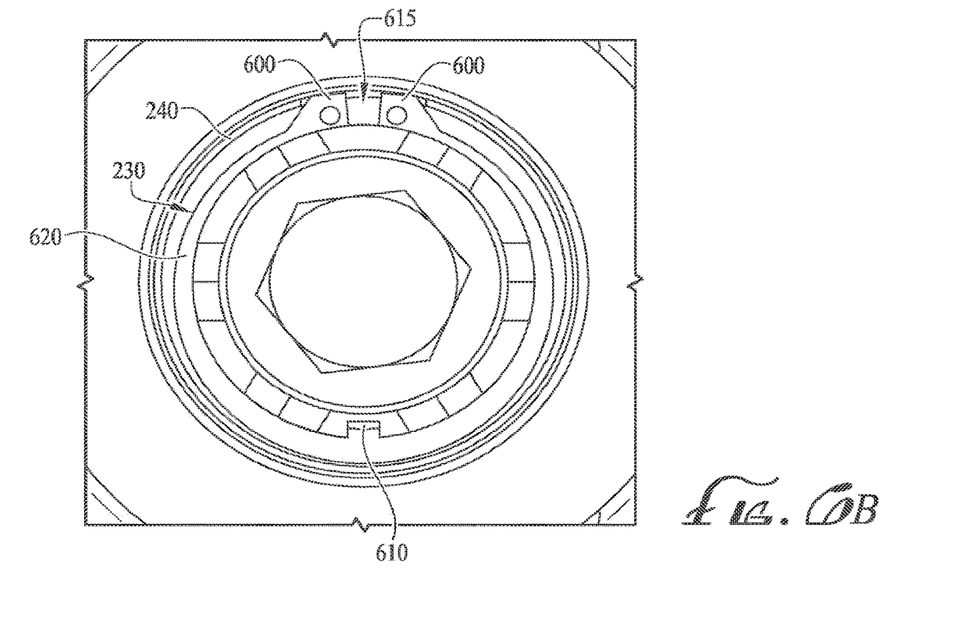
FIG. 6B is a bottom plan view of a retaining ring anti-migration system of an illustrative embodiment illustrating a notched trap sleeve of illustrative embodiments.
Figure 6C:
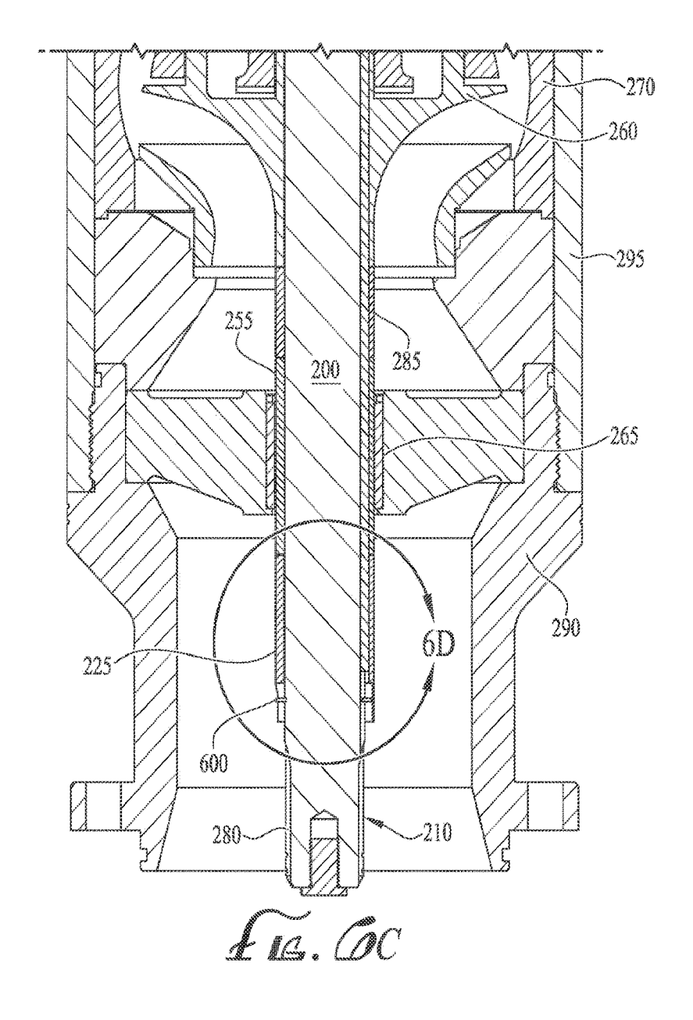
FIG. 6C is a cross sectional view of a retaining ring anti-migration system of an illustrative embodiment illustrating a notched trap sleeve of illustrative embodiments.
Figure 6D:
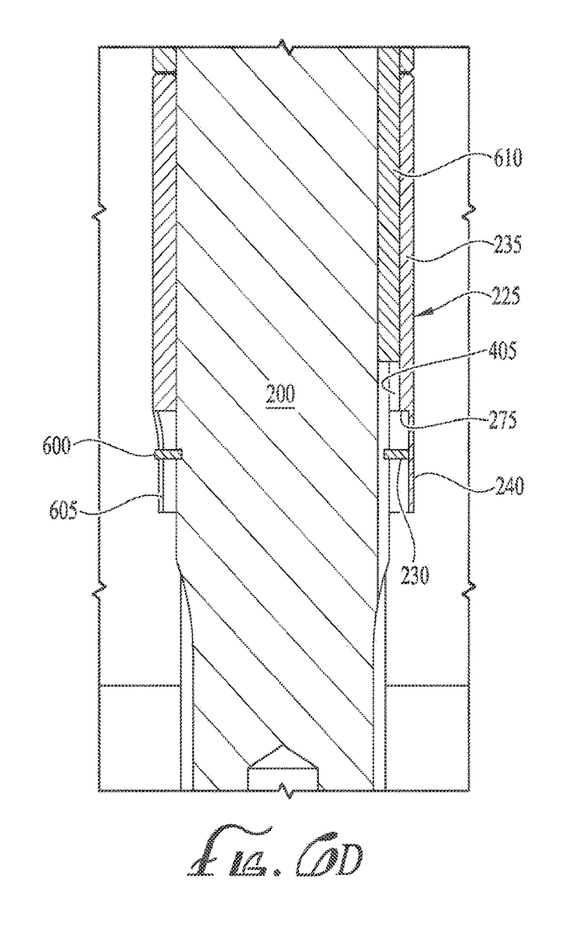
FIG. 6D is an enlarged view of the retaining ring anti-migration system of FIG. 6C.

Sleeve body 235 may include keyway 405 that may couple sleeve body 235 to shaft 200, for example with key 610 (shown in FIG. 6B), such that trap sleeve 225 rotates with shaft 200. Trap sleeve 225 may be composed of steel, tungsten carbide, Ni-resist, and/or another material having similar properties. Sleeve body 235 may be tubular, cylindrical and/or a hollow cylinder in shape and connected to the outer diameter of shaft 200 by a keyed, bolted, friction-fit, threaded, and/or another similar torque transferring connection. Jacket 240 may be tubular in shape, but with the inner diameter of jacket 240 larger than the inner diameter of sleeve body 235, to form clearance 245 between shaft 200 and jacket 240. Referring to FIG. 4C and FIG. 4D, wall of sleeve body 235 may be thicker in a radial direction than wall of jacket 240. In an illustrative example, body thickness 410 may be 0.3 cm while jacket thickness 415 may be 0.1 cm.

Figure 5A:
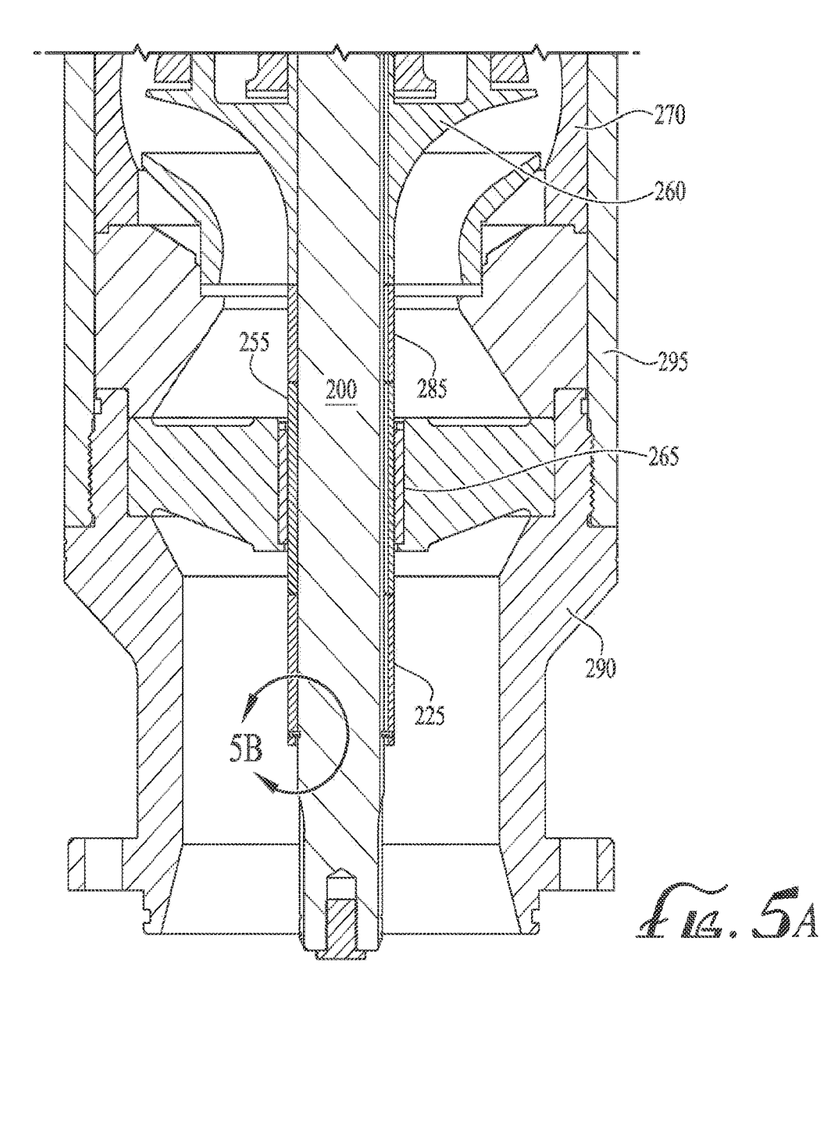
FIG. 5A is a cross sectional view of a retaining ring anti-migration system of an illustrative embodiment.
Figure 5B:
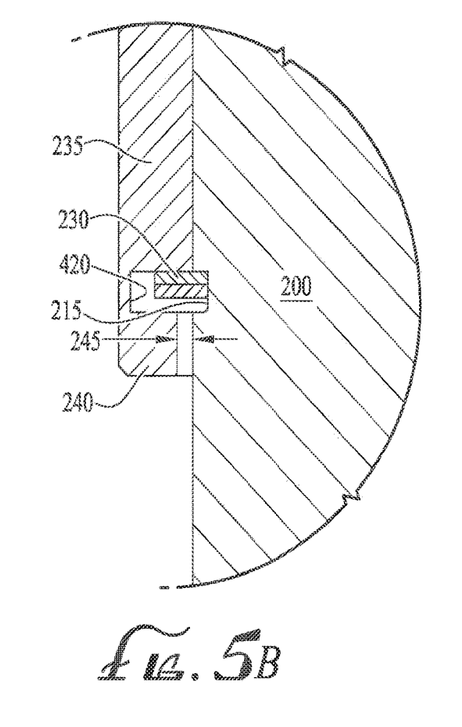
FIG. 5B is an enlarged view of the retaining ring anti-migration system of FIG. 5A.

In some embodiments, trap sleeve 225 and/or jacket 240 may include sleeve groove 420 opposite shaft groove 215 and/or retaining ring 230. FIG. 4B and FIG. 4D illustrate an exemplary trap sleeve 225 with sleeve groove 420 of illustrative embodiments. Sleeve groove 420 may be placed around jacket 240 adjacent sleeve body 235 and/or on trap sleeve 225 proximate, at and/or on the intersection between jacket 240 and sleeve body 235 and/or on jacket 240 adjacent shoulder 275. As shown in FIG. 5A and FIG. 5B, when seated, retaining ring 230 may be seated within each of sleeve groove 420 and shaft groove 215 and/or inside the space defined by aligned grooves 215, 420. Sleeve groove 420 may be particularly beneficial on a trap sleeve 225 that is installed second, subsequently and/or last, where a trap sleeve 225 is employed on both ends 210 of shaft 200 and/or at multiple locations along shaft 200. Sleeve groove 420 may simplify installation of trap sleeve 225, for example by allowing use of slip tool 700 (shown in FIG. 7) for installation. Sleeve groove 420 may extend circumferentially around the inner diameter of trap sleeve 225 and/or jacket 240 and oppose and/or align with shaft groove 215. Sleeve groove 420 and/or the set of grooves 215, 420 may provide a space that contains retaining ring 230 and holds retaining ring 230 in place, even if retaining ring 230 has been overstretched passed its yield strength and/or is subject to applied forces during operation of the ESP pump or other machine employing shaft 200. The inner diameter of sleeve groove 420 may be larger than the outer diameter of retaining ring 230 when retaining ring 230 is seated in shaft groove 215 in an unexpanded state, thereby providing space for expansion of retaining ring 230 without permitting axial migration of retaining ring 230. As demonstrated by comparing and contrasting FIG. 4C with FIG. 4D, in embodiments where jacket 240 includes sleeve groove 420, jacket 240 may be reduced in length since sleeve groove 420 may provide a shoulder both above and below retaining ring 230 such that trap sleeve 225 moves with retaining ring 230 rather than retaining ring 230 moving underneath jacket 240, the latter as shown in FIG. 3A and FIG. 3B.

During installation, retaining ring 230 may be expanded by slip tool 700 in order to allow retaining ring 230 to be placed around shaft 200, before being seated inside shaft groove 215. The additional space provided by sleeve groove 420, may allow retaining ring 230 to be expanded during installation and positioned underneath trap sleeve 225. When in place, retaining ring 230 may sit at least partially inside sleeve groove 420 and at least partially inside shaft groove 215, and/or may sit inside shaft groove 215 inward of sleeve groove 420. The outside of retaining ring 230 may seat and/or be positioned in sleeve groove 420, whereas the inside of retaining ring 230 may seat in shaft groove 215. When seated, retaining ring 230 may be trapped and/or enclosed between shaft groove 215 and sleeve groove 420 so as to remain in place on shaft 200 even as shaft 200 displaces along permitted slop clearance 220.

Turning to FIGS. 6A-6D, where retaining ring 230 includes ears 600, such as in snap ring embodiments, jacket 240 may include notch 605 to provide space for ears 600. Notch 605 may hold ears 600 in a position 180° from shaft key 610 in order to prevent shaft key 610 from migrating through gap 615 between retaining ring ears 600. Sleeve jacket 240 may extend around are 620 of retaining ring 230 when trap sleeve 225 is in place over retaining ring 230. Notch 605 may be a slot, notch, opening and/or indentation in jacket 240 that provides a space for ears 600 on the side of jacket 240 opposite key 610 and/or 180° from key 610. Notch may surround both ears 600, and extend longitudinally into jacket 240 to permit retaining ring 230 to slide with shaft 200 underneath jacket 240. Positioning ears 600 in an orientation 180° from shaft key 610 may prevent key 610 from sliding through gap 615 in retaining ring 230 during rotation of shaft 200. Where shaft 200 is a centrifugal pump shaft, care must be taken to prevent key 610 from migrating through gap 615 between ears 600 of retaining ring 230, in order to prevent impellers 260 from losing engagement with key 610.

A method of illustrative embodiments may employed to place retaining rings 230 with trap sleeves 225 on both ends 210 of shaft 200 and/or where multiple trap sleeves 225 are employed along a single shaft 200. The method of illustrative embodiments may be particularly useful with respect to installation of a second trap sleeve 225 on a second end 210 of shaft 200, where a first trap sleeve 225 has been previously installed on a first end 210 of shaft 200. For example, the method of illustrative embodiments may be used to install a second trap sleeve 225 near the top of shaft 200 once a first trap sleeve 225 has been installed near the bottom of the same shaft 200, or vice versa. Illustrative embodiments may employ a slip tool to install trap sleeve 225 and retaining ring 230 into position on shaft 200.

Figure 7:
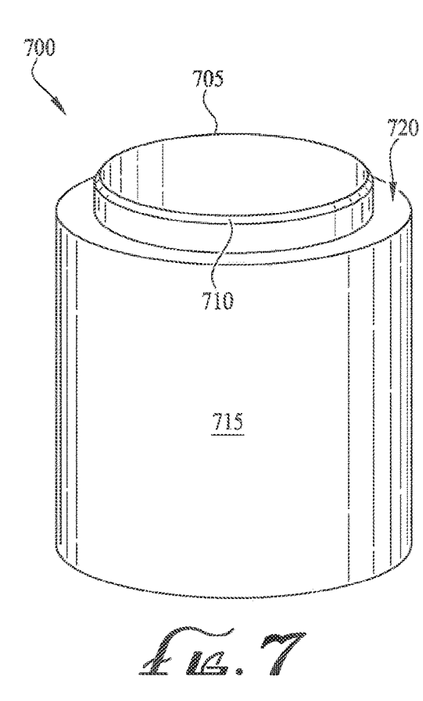
FIG. 7 is a perspective view of a slip tool of an illustrative embodiment.

Referring to FIG. 7, slip tool 700 may have a hollowed cylindrical shape with an inner diameter slightly larger than the outer diameter of shaft 200 so as to allow slip tool 700 to slide over shaft 200. Slip tool 700 may include collar 705 extending axially from the inner diameter of tubular body 715 of slip tool 700. Collar 705 may allow slip tool 700 to fit inside trap sleeve 225 underneath the inner diameter of retaining ring 230 and/or between shaft 200 and retaining ring 230. Collar 705 may include bevel 710 which may form a sloped surface at the tip of collar 705, in order to allow slip tool 700 to glide underneath retaining ring 230 without catching on retaining ring 230. Bevel 710 may slant towards shaft 200 (inward) as it extends away from tubular body 715. Platform 720 may be formed where collar 705 connects to tubular body 715 of slip tool 700. Platform 720 may extend along the width and/or top of tubular body 715 from the outer diameter of collar 705 to the outer diameter of tubular body 715. Platform 720 may seat base 800 (shown in FIG. 8D) of trap sleeve 225 during installation of retaining ring 230 on shaft 200.

Figure 8A:
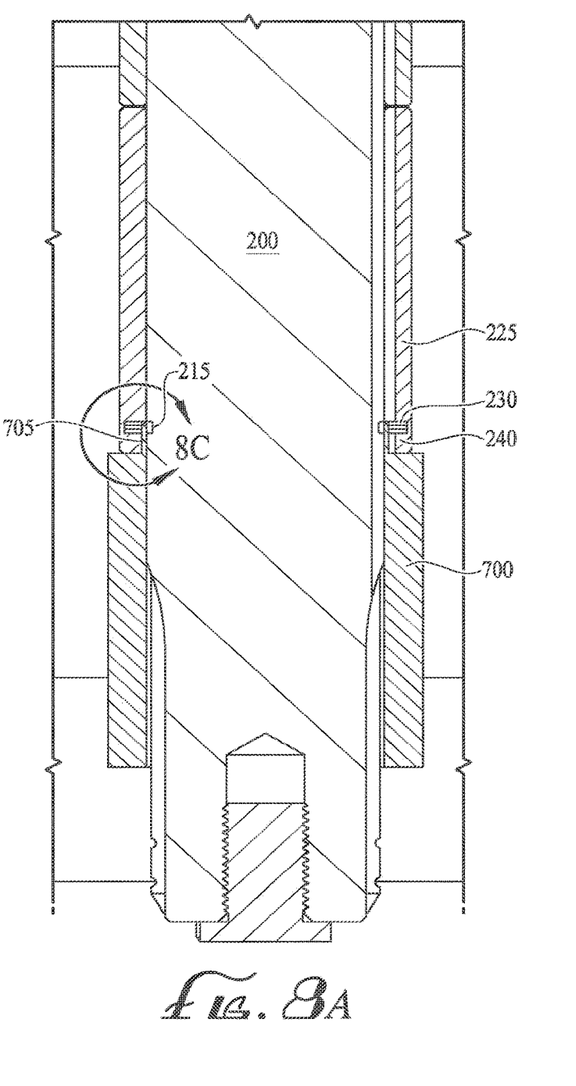
FIGS. 8A-8D are cross-sectional views of a method of installing a retaining ring-anti-migration system of an illustrative embodiment.
Figure 8B:
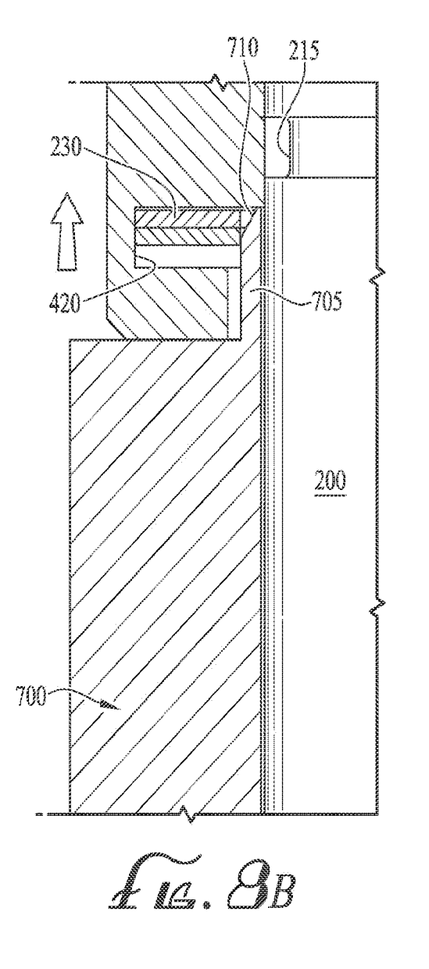
Figure 8C:
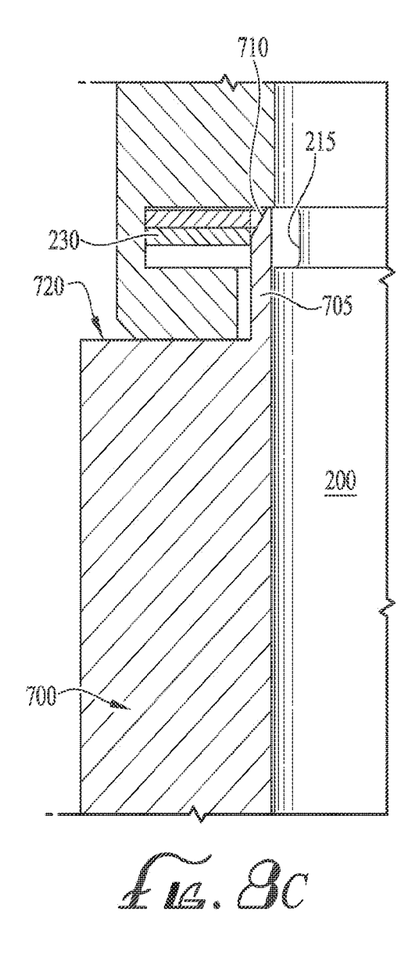
Figure 8D:
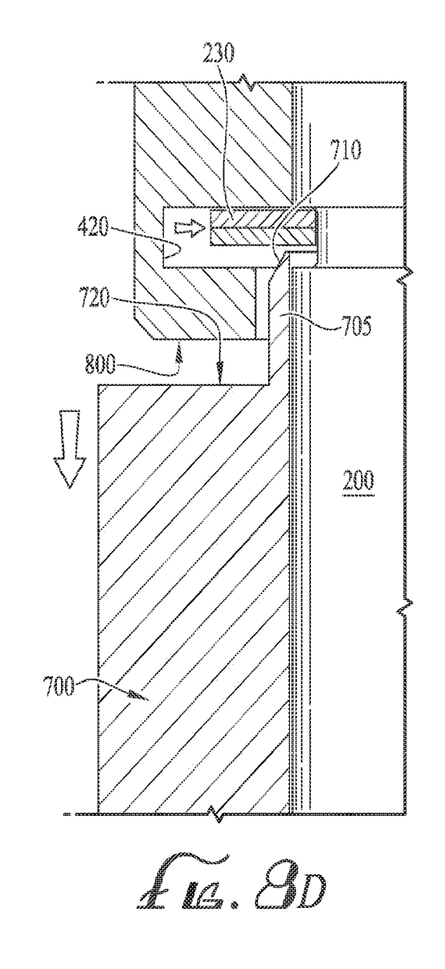

Turning to FIGS. 8A-8D, a method of installing a retaining ring anti-migration system of illustrative embodiments may include aligning retaining ring 230 with sleeve groove 420 on the inside of trap sleeve 225 and/or jacket 240. Once retaining ring 230 is aligned with sleeve groove 420, collar 705 of slip tool 700 may slip inside of trap sleeve 225 until base 800 of trap sleeve 225 sits on platform 720 of slip tool 700. As collar 705 slides inside trap sleeve 225, collar 705 may pass inside of retaining ring 230 and expand retaining ring 230 outwards such that retaining ring 230 expands into sleeve groove 420. Trap sleeve 225, with retaining ring 230 expanded within sleeve groove 420, may be positioned such that keyway 405 of sleeve body 235 may be aligned and mate with shaft key 610. Trap sleeve 225, with expanded retaining ring 230 and slip tool 700, may then slide around and along shaft 200 until retaining ring 230 is aligned with shaft groove 215. FIG. 8B illustrates trap sleeve 225 with slip tool 700 and expanded retaining ring 230 sliding around shaft 200 and moving towards a position where retaining ring 230 will be aligned with shaft groove 215. FIGS. 5A and 5C illustrate retaining ring 230 aligned with shaft groove 215, with slip tool 700 inserted and expanding retaining ring 230 into sleeve groove 420. Once aligned, slip tool 700 may then be removed from around shaft 200, leaving retaining ring 230 and trap sleeve 225 in place around shaft 200, and allowing retaining ring 230 to contract into shaft groove 215, as shown in FIG. 8D. Retaining ring 230 may thus be seated within shaft groove 215 and inside trap sleeve 225, and once placed using the method of illustrative embodiments, trap sleeve 225 may block migration of retaining ring 230 out of shaft groove 215.

A retaining ring anti-migration system and method has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A retaining ring anti-migration system comprising:
   a retaining ring seated in a shaft groove, the shaft groove extending circumferentially around an electric submersible pump (ESP) shaft;
   a trap sleeve extending around the ESP shaft adjacent to the retaining ring, the trap sleeve comprising:
      a sleeve body secured to the ESP shaft such that the trap sleeve rotates with the ESP shaft; and
      a jacket extending axially from the sleeve body over an outer diameter of the retaining ring; and
   a clearance extending between the ESP shaft and an inner diameter of the jacket.

2. The retaining ring anti-migration system of claim 1, wherein the outer diameter of the retaining ring is pressed against the inner diameter of the jacket.

3. The retaining ring anti-migration system of claim 1, wherein the trap sleeve further comprises a sleeve groove extending circumferentially around the inner diameter of the jacket opposite the shaft groove, the retaining ring seated at least partially in the shaft groove and at least partially in the sleeve groove.

4. The retaining ring anti-migration system of claim 3, wherein the sleeve groove is proximate an intersection between the sleeve body and the jacket, and the retaining ring abuts the sleeve body.

5. The retaining ring anti-migration system of claim 1, wherein the sleeve body is secured to the ESP shaft by a key, the jacket comprises a notch 180° from the key, and the retaining ring comprises a pair of ears that extend into the notch.

6. The retaining ring anti-migration system of claim 1, wherein the ESP shaft is a centrifugal pump shaft, the retaining ring is seated proximate splines at an end of the ESP shaft, and the retaining ring is separated from the splines by a slop clearance.

7. The retaining ring anti-migration system of claim 1, wherein an intersection between the sleeve body and the jacket forms a shoulder, and the retaining ring is wedgeable against the shoulder to bound axial migration of the ESP shaft.

8. The retaining ring anti-migration system of claim 1, wherein there are at least two of the retaining rings and at least two of the trap sleeves around the ESP shaft, a first retaining ring of the at least two retaining rings and a first trap sleeve of the at least two trap sleeves secured adjacent a top of the ESP shaft, and a second retaining ring of the at least two retaining rings and a second trap sleeve of the at least two trap sleeves secured adjacent a bottom of the ESP shaft.

9. The retaining ring anti-migration system of claim 1, wherein the jacket is configured to prevent radial expansion of the retaining ring.

10. The retaining ring anti-migration system of claim 1, wherein the retaining ring is one of a spiral ring, spring ring or a snap ring.

11. A method for installing a retaining ring anti-migration system around an electric submersible pump (ESP) shaft, the installation method comprising:
    aligning a retaining ring with a jacket groove that extends circumferentially around an inside of a jacket, the jacket extending from a body of a trap sleeve;
    passing a collar of a slip tool inside an inner diameter of the retaining ring to expand the retaining ring into the jacket groove;
    sliding the trap sleeve with the expanded retaining ring and slip tool around the ESP shaft until the retaining ring is aligned with a shaft groove and a keyway along the body of the trap sleeve is keyed to the ESP shaft; and
    removing the collar from inside the retaining ring to allow the retaining ring to relax into the shaft groove.

12. The method of claim 11, further comprising blocking migration of the retaining ring out of the shaft groove with the jacket.

13. The method of claim 11, wherein the relaxed retaining ring seats partially in the shaft groove and partially in the jacket groove.

14. The method of claim 11, wherein the jacket comprises a notch 180° from the keyway, the retaining ring comprises a pair of ears, and the retaining ring is aligned with the jacket groove such that the pair of ears extend into the notch.

15. The method of claim 11, wherein the shaft groove is proximate an end of the ESP shaft and the retaining ring prevents axial migration of the ESP shaft.

16. The method of claim 15, wherein prior to sliding the trap sleeve around the ESP shaft, the ESP shaft comprises a second trap sleeve keyed proximate a second end of the ESP shaft, the second trap sleeve comprising a second jacket extending over a second retaining ring positioned around the ESP shaft.

17. The method of claim 16, wherein when installed, the retaining ring and the second retaining ring together prevent axial displacement of the ESP shaft beyond a slop clearance.

18. A retaining ring anti-migration system for a shaft of a centrifugal pump of an electric submersible pump assembly, the retaining ring anti-migration system comprising a pair of trap sleeves that enclose a pair of retaining rings, one retaining ring of the pair of retaining rings around each end of the shaft enclosed by one trap sleeve of the pair of trap sleeves, the pair of retaining rings configured to bound axial migration of the shaft both upwards and downwards, and a plurality of centrifugal pump stages between the pair of retaining rings;

wherein each trap sleeve of the pair of trap sleeves comprises a jacket extending from a body, the body keyed to the shaft and the intersection of the jacket and the body forming a shoulder against which the one retaining ring wedges to bound the axial migration of the shaft.

19. The retaining ring anti-migration system of claim 18, further comprising a series of sleeves keyed to the shaft between the one trap sleeve and an impeller of the centrifugal pump.

20. The retaining ring anti-migration system of claim 18, wherein the pair of trap sleeves comprise a first trap sleeve proximate a bottom end of the shaft mated with a first retaining ring of the pair of retaining rings, and a second trap sleeve proximate a top end of the shaft mated with a second retaining ring of the pair of retaining rings, the first trap sleeve comprising an elongate jacket and the first retaining ring moveable axially underneath the jacket, and a second trap sleeve comprising a sleeve groove wherein the second retaining ring extends into the sleeve groove.

* * * * *